United States Patent
Ozaki et al.

(10) Patent No.: US 10,242,598 B2
(45) Date of Patent: Mar. 26, 2019

(54) TECHNIQUE SIMULATOR

(71) Applicant: TERUMO KABUSHIKI KAISHA, Shibuya-ku, Tokyo (JP)

(72) Inventors: Kouji Ozaki, Kanagawa (JP); Yoshihiro Nakamura, Kanagawa (JP)

(73) Assignee: TERUMO KABUSHIKI KAISHA, Shibuya-Ku, Tokyo (JP)

( * ) Notice: Subject to any disclaimer, the term of this patent is extended or adjusted under 35 U.S.C. 154(b) by 283 days.

(21) Appl. No.: 15/271,999

(22) Filed: Sep. 21, 2016

(65) Prior Publication Data
US 2017/0011658 A1 Jan. 12, 2017

Related U.S. Application Data

(63) Continuation of application No. PCT/JP2015/052428, filed on Jan. 29, 2015.

(30) Foreign Application Priority Data

Mar. 27, 2014 (JP) ................................. 2014-065172

(51) Int. Cl.
*G09B 23/28* (2006.01)
*G09B 23/30* (2006.01)
(Continued)

(52) U.S. Cl.
CPC ........... *G09B 23/303* (2013.01); *G09B 23/30* (2013.01); *G09B 23/32* (2013.01); *G09B 23/34* (2013.01)

(58) Field of Classification Search
CPC ...... G09B 23/28; G09B 23/285; G09B 23/30; G09B 23/303; G09B 23/34
(Continued)

(56) References Cited

U.S. PATENT DOCUMENTS

| 2,689,415 A * | 9/1954 | Haver .................. G09B 23/285 434/272 |
| 3,722,108 A * | 3/1973 | Chase .................. G09B 23/285 434/267 |

(Continued)

FOREIGN PATENT DOCUMENTS

| CN | 201159954 Y | 12/2008 |
| CN | 201796534 U | 4/2011 |

(Continued)

OTHER PUBLICATIONS

Extended European Search Report dated Aug. 11, 2017, by the European Patent Office in corresponding European Patent Application No. 15768431.7 (6 pages).
Cunningham, Rebecca, "Arterial Line Insertion Simulator", Published: Apr. 26, 2012, XP055393384, [online], Retrieved from: https://web.wpi.edu/Pubs/E-project/Available/E-project-042612-121514/unrestricted/CunninghamMQP.pdf [retrieved on Jul. 24, 2017], pp. 1-48.

(Continued)

*Primary Examiner* — Kurt Fernstrom
(74) *Attorney, Agent, or Firm* — Buchanan Ingersoll & Rooney PC

(57) ABSTRACT

A technique simulator for training a user to introduce a medical device into a radial artery of a human body. The technique simulator includes an arm model possessing an appearance that imitates portions of a human arm including at least a wrist and a simulated human subcutaneous region arranged in a storage groove formed in the wrist of the arm model. The technique simulator also includes a simulated human radial styloid process arranged in a bone arranging hole formed in the simulated human subcutaneous region and a simulated human skin that covers a simulated human blood vessel. The simulated human blood vessel is configured to be inserted in the simulated human subcutaneous region and the simulated human radial styloid process.

19 Claims, 6 Drawing Sheets

(51) Int. Cl.
*G09B 23/32* (2006.01)
*G09B 23/34* (2006.01)

(58) Field of Classification Search
USPC .................. 434/262, 267, 268, 272, 274
See application file for complete search history.

(56) References Cited

U.S. PATENT DOCUMENTS

| | | | | |
|---|---|---|---|---|
| 3,789,518 | A * | 2/1974 | Chase | G09B 23/34 264/222 |
| 4,182,054 | A * | 1/1980 | Wise | G09B 23/285 434/268 |
| 5,215,469 | A | 6/1993 | Kohnke et al. | |
| 5,839,904 | A * | 11/1998 | Bloom | G09B 23/285 434/268 |
| 7,306,465 | B2 * | 12/2007 | White | G09B 23/285 434/268 |
| 8,469,717 | B2 * | 6/2013 | Park | G09B 23/30 434/268 |
| 8,690,580 | B2 * | 4/2014 | Paronen | G09B 23/30 434/267 |
| 2013/0052626 | A1 * | 2/2013 | Hoskins | G09B 23/30 434/268 |
| 2013/0078603 | A1 * | 3/2013 | Yang | G09B 23/285 434/268 |
| 2014/0377731 | A1 * | 12/2014 | Conrad | G09B 23/303 434/268 |

FOREIGN PATENT DOCUMENTS

| | | |
|---|---|---|
| JP | 2006-317570 A | 11/2006 |
| JP | 2012-168262 A | 9/2012 |
| JP | 2013-246393 A | 12/2013 |

OTHER PUBLICATIONS

Campeau, Lucien, "Percutaneous Radial Artery Approach for Coronary Angiography", Catheterization and Cardiovascular Diagnosis, 16:3-7, Jan. 1, 1989, XP055393969, pp. 1-5, [online] Retrieved from: http://onlinelibrary.wiley.com/store/10.1002/ccd.1810160103/asset/1810160103_ftp.pdf?v=1&t=j5kw9loe&s=c5d70496a27799b477499bb53663b42e5f721606 [retrieved on Jul. 26, 2017].

Anonymous: "Limbs & Things—Bringing Skills Training to Life", 2012 catalogue, Jan. 1, 2012, XP055394036, [online] Retrieved from: http://speeding.hu/doclib/436/limbs-things.pdf [retrieved on Jul. 26, 2017], pp. 1-97.

International Search Report (PCT/ISA/210) dated Apr. 7, 2015, by the Japanese Patent Office as the International Searching Authority for International Application No. PCT/JP2015/052428.

Written Opinion (PCT/ISA/237) dated Apr. 7, 2015, by the Japanese Patent Office as the International Searching Authority for International Application No. PCT/JP2015/052428.

First Office Action dated May 3, 2018, by the State Intellectual Property Office of People's Republic of China in corresponding Chinese Patent Application No. 201580006651.4 (14 pages).

* cited by examiner

TECHNIQUE SIMULATOR

CROSS-REFERENCES TO RELATED APPLICATIONS

This application is a continuation of International Application No. PCT/JP2015/052428 filed on Jan. 29, 2015, and claims priority to Japanese Patent Application No. 2014-065172 filed on Mar. 27, 2014, the entire content of both of which is incorporated herein by reference.

TECHNICAL FIELD

The present invention generally relates to a technique simulator for training a user how to introduce a medical device into a radial artery of a human body.

BACKGROUND DISCUSSION

In recent years, trans-radial coronary intervention (TRI) has been performed to examine and treat a lesioned part of a coronary artery. TRI involves introducing a catheter through a radial artery in a wrist of a human body and leading the catheter to the lesioned part of the coronary artery. Such trans-radial coronary intervention is minimally invasive, compared with introducing the catheter through a femoral artery. Therefore, the burden on patients, the risk of disease complication, and the like can be reduced.

The radial artery, however, is relatively narrow, and thus it is not easy to puncture the radial artery with a penetration needle such as a vascular access device. Therefore, development of a simulator for training a user how to perform a technique to puncture the radial artery with the penetration needle is desired.

In relation to such a technique simulator, for example, Japanese Patent Application No. 2006-317570 A discloses a training model for an injection into the radial artery. This injection training model is configured such that a simulated blood vessel (in which simulated blood circulates) is arranged in a wrist of an artificial arm. The simulated blood vessel is covered with a simulated human tissue cover.

SUMMARY

When puncturing the radial artery with the penetration needle, there is a procedure where a user (medical operator) searches for the position of a radial styloid process near the skin of the wrist by touching the wrist of the patient (subject) and punctures the radial artery with the penetration needle using the radial styloid process as an indication of the location of the radial artery.

In the conventional technology like JP 2006-317570 A above, however, no member corresponding to the radial styloid process exists near the skin of the wrist of the artificial arm (arm model). The injection to the radial artery thus cannot be performed using the radial styloid process as an indication of the location of the radial artery. Therefore, a technique to puncture a radial artery of a human body with a penetration needle of an injector or the like may not be able to be efficiently learned.

The technique simulator disclosed here has been made in view of the aforementioned problem. The technique simulator provides a simulation experience approximating an actual technique performed on a human body. The technique simulator allows a user to efficiently learn a technique to puncture a radial artery with a penetration needle.

A technique simulator for training a user to introduce a medical device into a radial artery of a human body includes an arm model formed to imitate appearance of portions including at least a wrist of a human arm; a simulated human subcutaneous region arranged in a storage groove formed in the wrist of the arm model; a simulated human radial styloid process arranged in a bone arranging hole formed in the simulated human subcutaneous region; and a simulated human skin that covers a simulated human blood vessel to be arranged in the simulated human subcutaneous region and the simulated human radial styloid process.

The technique simulator disclosed here has the simulated human radial styloid process arranged near the simulated human skin positioned in the wrist of the arm model. Therefore, a user can search for the position of the simulated human radial styloid process by touching the simulated human skin of the wrist of the arm model and can puncture the simulated human blood vessel with a penetration needle using the simulated human radial styloid process as an indication of the location of the radial artery. Therefore, the user can experience a simulation that approximates an actual technique on a human body to efficiently learn the technique to puncture the radial artery with the penetration needle.

A blood vessel arranging groove in which the simulated human blood vessel is arranged may be formed in the simulated human radial styloid process in the technique simulator disclosed here.

According to this configuration, the simulated human radial styloid process and the simulated human blood vessel can be held in a predetermined positional relationship.

In the technique simulator disclosed here, the simulated human radial styloid process may be arranged in the bone arranging hole such that a part of the simulated human radial styloid process protrudes on a side of the simulated human skin with respect to the simulated human subcutaneous region.

According to this configuration, the user can reliably grasp the position of the simulated human radial styloid process by touching the simulated human skin provided in the wrist of the arm model.

The simulated human subcutaneous region in the technique simulator may be configured from a softer material than the arm model.

According to this configuration, the user can favorably learn a technique of so-called wall-penetration puncture to stick the penetration needle to penetrate a posterior wall of the simulated human blood vessel up to the simulated human subcutaneous region. The tip end of the penetration needle is then indwelled in the simulated human blood vessel. The user (operator) can also learn a technique of so-called anterior wall puncture to indwell the tip end of the penetration needle in the simulated human blood vessel without sticking the penetration needle through the posterior wall of the simulated human blood vessel.

The technique simulator may have the simulated human blood vessel positioned to a side of a groove bottom surface of the storage groove as the simulated human blood vessel goes from the wrist to a forearm side of the arm model.

According to this configuration, the user's search for the simulated human blood vessel can be made more difficult, as the simulated human blood vessel goes from the wrist to the forearm side of the arm model (as the simulated human blood vessel is away from the simulated human radial styloid process). Accordingly, the user can experience a simulation that approximates an actual technique to be used on a human body.

At least a part of surface where the simulated human blood vessel is arranged in the simulated human subcutaneous region may be inclined to the side of the groove bottom surface of the storage groove along a direction from the wrist to the forearm of the arm model.

According to this configuration, the simulated human blood vessel can be positioned to the groove bottom surface side as the simulated human blood vessel goes from the wrist to the forearm side of the arm model.

In the above-described technique simulator, a discharge hole through which simulated human blood in the simulated human blood vessel passes may be formed in the groove bottom surface that configures the storage groove, and a tray that receives the simulated human blood led through the discharge hole may be further included.

According to the configuration, for example, the simulated human blood leaking out through the simulated human blood vessel when the simulated human blood vessel is punctured with the penetration needle can be received by the tray. Therefore, the technique simulator can be easily restored to/maintained in a clean state.

The tray may be detachably provided in the arm model of the technique simulator.

This allows the tray in which the simulated human blood is accumulated to be taken out of the arm model. Therefore, the tray can be easily restored to a clean state, and the simulated human blood can be easily disposed or re-used.

An inner hole of one end portion of the simulated human blood vessel may be blocked in the technique simulator, and the technique simulator may include pressure providing means that provides pressure to the simulated human blood in the simulated human blood vessel.

According to the configuration, the simulated human blood vessel can beat (i.e., pulsate or throb) under the action of the pressure providing means. Therefore, the user can experience a simulation that further approximates an actual technique performed on a human body. Additionally, when the inner hole of the one end portion of the simulated human blood vessel is blocked, the configuration can be simplified and pulsation can be easily caused in the simulated human blood vessel compared with when the simulated human blood vessel is a circulation circuit (i.e., the inner hole of the one end portion is not blocked).

According to the technique simulator disclosed here, the human radial styloid process substitute is arranged near the human skin substitute positioned in the wrist of the arm model. Therefore, the user can experience a simulation that approximates an actual technique performed on a human body. The technique simulator thus allows the user (operator) to efficiently learn a technique to puncture the radial artery with the penetration needle.

DETAILED DESCRIPTION

A technique simulator and method of using a technique simulator according to the described aspects of the present disclosure will be described in detail below, with reference to the embodiments in the attached drawings. These embodiments represent examples of the inventive technique simulator and method of using the technique simulator disclosed here. In the below description, "inner side" refers to the side of the hand where the palm is located and "outer side" refers to the back of the hand (the side opposite to the palm).

Figure 1:
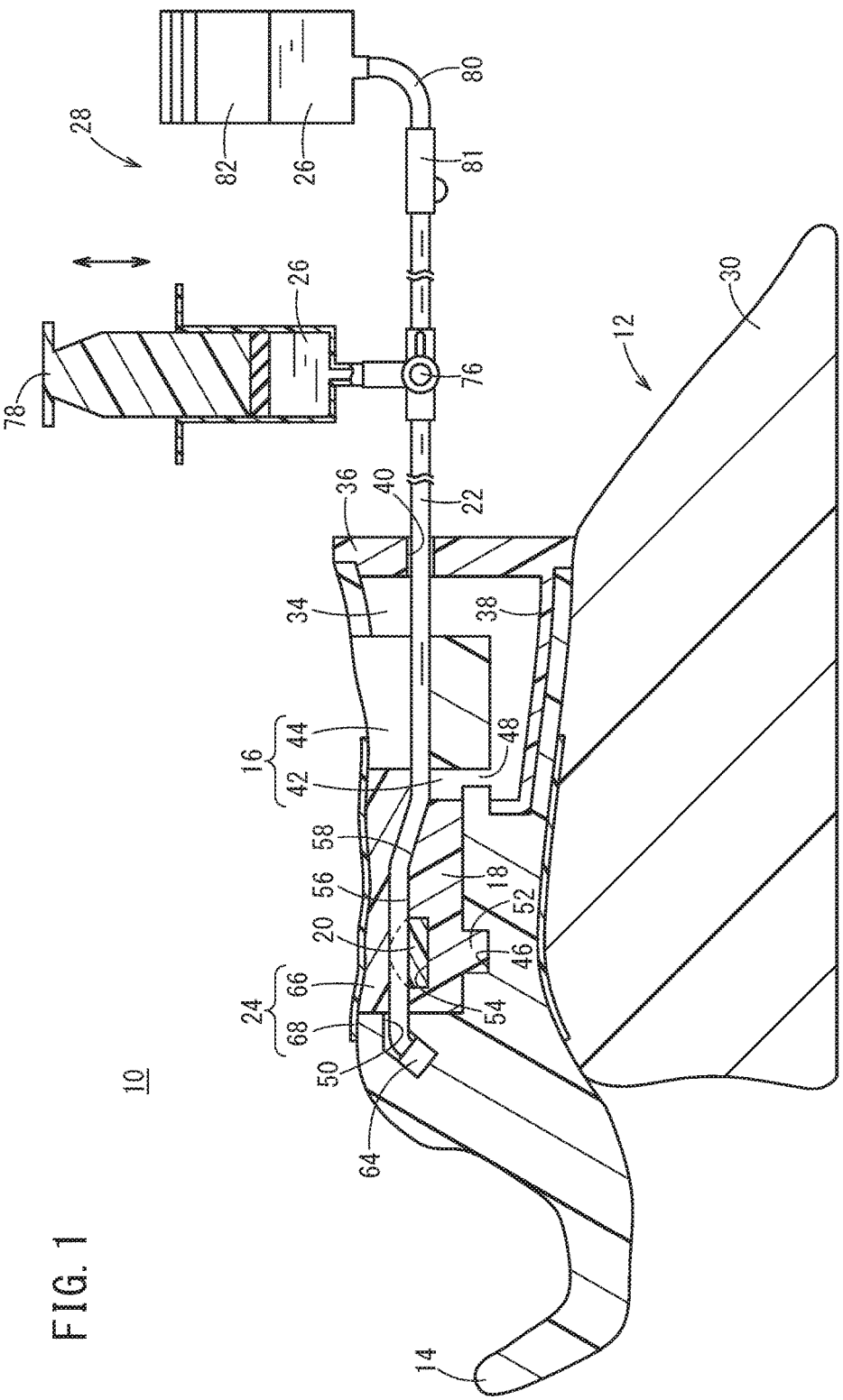
FIG. 1 is a schematic sectional view of an embodiment of a technique simulator.
Figure 2:
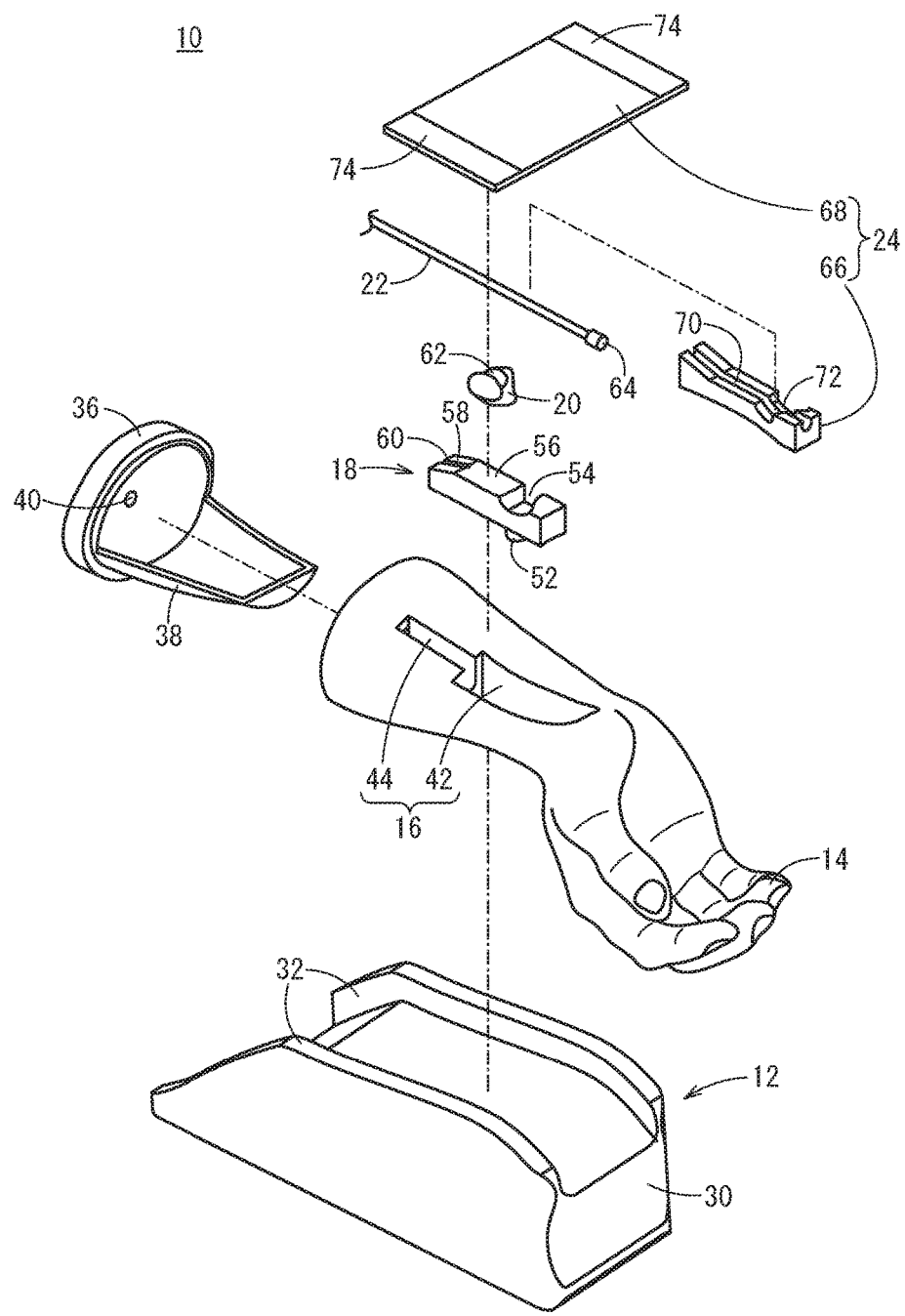
FIG. 2 is a partially omitted exploded perspective view of the technique simulator illustrated in FIG. 1.
Figure 3:
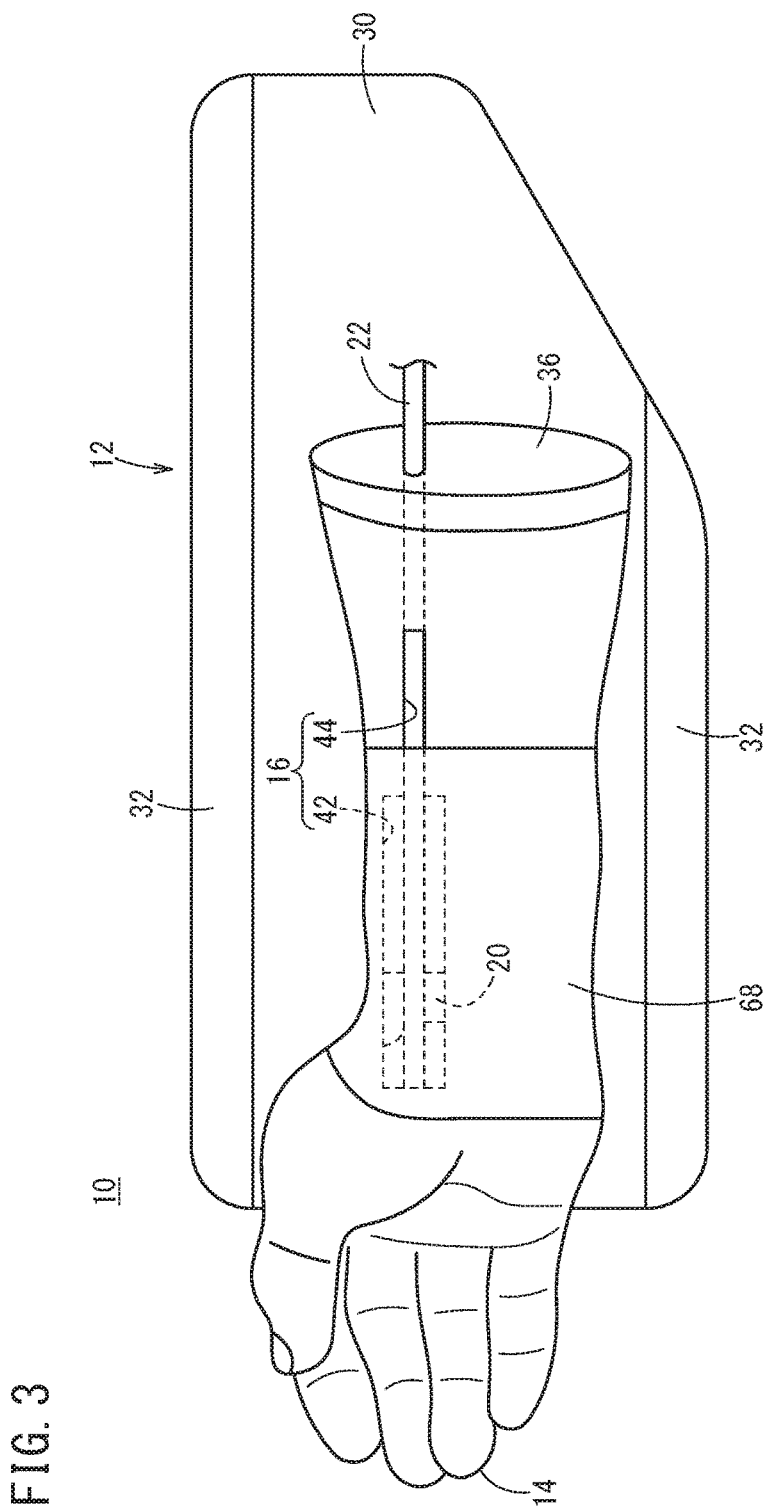
FIG. 3 is a partially omitted plan view of the technique simulator illustrated in FIG. 1.

The embodiment of the technique simulator 10 illustrated in FIGS. 1-3 is used to mainly train users how to introduce a medical device into a radial artery of a human body. For example, the technique simulator 10 is used to train a technique of trans-radial coronary intervention.

As illustrated in FIGS. 1 to 3, the technique simulator 10 includes a support table 12 and an arm model 14 placed on the support table 12. A simulated human subcutaneous region 18 is arranged in a storage groove 16 formed in the arm model 14. The technique simulator also includes a simulated human radial styloid process 20 and a simulated human blood vessel 22 provided in the simulated human subcutaneous region 18. A simulated human skin 24 covers the simulated human blood vessel 22. There is also a simulated human blood supply section 28 that supplies simulated human blood 26 to the simulated human blood vessel 22.

The support table 12 supports the arm model 14 in a predetermined posture. The support table 12 includes a support table main body 30 that supports the arm model 14 from below and a pair of side walls 32 that extend upwards from the support table 12 to prevent dropping of the arm model 14 placed on the support table main body 30.

The arm model 14 is formed to imitate the appearance of a portion of a human arm from the forearm through the fingertips. Note that the arm model 14 may imitate the portion of the human arm spanning from the finger tips to an upper arm region. In the present embodiment, the arm model 14 is formed to imitate appearance of a human right arm as illustrated in FIGS. 2 and 3. However, the arm model 14 may be formed to imitate appearance of a human left arm.

The wrist of the arm model 14 is flexed in a dorsal direction by a predetermined angle (for example, 15°). Accordingly, the arm model 14 can approximate a form of the human arm so that a user may practice puncturing the radial artery of the human body with a vascular access device 100. The configuration material of the arm model 14 is not especially limited. However, for example, a resin material such as urethane or elastomer can be favorably used.

The arm model 14 is provided with an attaching hole 34 that opens toward a base end side (i.e., the side opposite the fingertip side) and a cover portion 36 that blocks the opening portion of the attaching hole 34. The cover portion 36 is integrally provided with a tray 38 that is arranged in the attaching hole 34 and receives the simulated human blood 26 when the simulated human blood 26 leaks out through the simulated human blood vessel 22. The cover portion 36 has an insertion through hole 40 into which the simulated human blood vessel 22 is inserted. The cover portion 36 and the tray 38 can be made from a resin material such as urethane or elastomer, for example, similarly to the arm model 14.

A storage groove 16 extending from the wrist toward the forearm is formed in an inner surface (palm-side surface) of the arm model 14. The storage groove 16 includes a wide deep groove 42 positioned at a tip end side (i.e., the fingertip side) and a narrow shallow groove 44 positioned at the base end side (i.e., opposite the fingertip side). A positioning hole 46 that positions the simulated human subcutaneous region 18 is formed in a groove bottom surface of the deep groove 42. The groove bottom surface of the deep groove 42 also has a discharge hole 48 that is positioned above the tray 38 and allows the deep groove 42 to communicate with the attaching hole 34. In the present embodiment, the discharge hole 48 is positioned in the base end (i.e., the side opposite the fingertip side) of the groove bottom surface of the deep groove 42.

An arranging hole 50 in which one end portion of the simulated human blood vessel 22 is arranged is formed in a groove side surface that configures the deep groove 42 and positioned at the fingertip end side. The arranging hole 50 extends to the fingertip end side of the arm model 14 in an approximately horizontal manner, and then extends toward an outer surface side of the arm model 14 (the back side of the hand). Accordingly, the arranging hole 50 can easily hold the one end portion of the simulated human blood vessel 22. The shallow groove 44 is a groove in which a part of the simulated human blood vessel 22 is arranged. An opening portion of the shallow groove's 44 base end side (i.e., the side opposite to the fingertip side) faces the insertion through hole 40 of the cover portion 36.

The simulated human subcutaneous region 18 is a human subcutaneous region substitute that imitates a human subcutaneous region. The simulated human subcutaneous region 18 is formed in a block manner. To be specific, the simulated human subcutaneous region 18 is formed in a rectangular parallelepiped shape. The simulated human subcutaneous region 18 includes a positioning protruding portion 52 that is fit into the positioning hole 46. The entire length of the simulated human subcutaneous region 18 is set to be shorter than the entire length of the deep groove 42. The base end surface of the simulated human subcutaneous region 18 (i.e., the surface on the side of the human subcutaneous region 18 that is opposite of the fingertip side) is positioned at the fingertip end side of the discharge hole 48 in a state where the positioning protruding portion 52 is fit in the positioning hole 46 (see FIG. 1).

Accordingly, flow to the discharge hole 48 can be prevented from being blocked by the simulated human subcutaneous region 18. In the present embodiment, a fingertip end surface and both side surfaces of the simulated human subcutaneous region 18 are in contact with groove side surfaces that configure the deep groove 42 when the positioning protruding portion 52 is fit in (i.e., is seated in or is within) the positioning hole 46.

A surface (back surface or top surface as shown in FIG. 2) opposite to the side where the positioning protruding portion 52 is positioned of the simulated human subcutaneous region 18 includes a horizontal plane 56 in which a bone arranging hole 54 is formed. The bone arranging hole 54 is hole in which the simulated human radial styloid process 20 may be inserted. The simulated human subcutaneous region 18 also has an inclined surface 58 inclined towards the positioning protruding portion 52 side (the groove bottom surface side of the deep groove 42) and towards the base end side of the simulated human subcutaneous region 18.

The bone arranging hole 54 is positioned in the wrist of the arm model 14 when the positioning protruding portion 52 is fit in the positioning hole 46. A support groove 60 extends throughout the entire length of the inclined surface 58 in the center of the inclined surface 58 in a width direction. The simulated human blood vessel 22 is configured to be inserted in the support groove 60.

The simulated human subcutaneous region 18 is favorably configured from a soft resin material having a hardness that is puncturable by the vascular access device 100. In other words, the simulated human subcutaneous region 18 is configured from a softer resin material than the configuration material of the arm model 14. Silicone rubber is an example of a material that can form the simulated human subcutaneous region 18. In this case, Durometer hardness (type C) of silicone rubber favorably falls within a range of 12 to 34, and more favorably 23. If the hardness falls within the range of 12 to 34, pulsation of the simulated human blood vessel 22 can be efficiently transmitted to the simulated human skin 24, and wall-penetration puncture to penetrate a posterior wall of the simulated human blood vessel 22 and stick the vascular access device 100 up to the simulated human subcutaneous region 18 can be favorably performed.

The simulated human radial styloid process 20 is a human body radial styloid process substitute that imitates a human radial styloid process. The simulated human radial styloid process 20 is formed in a block manner. A blood vessel arranging groove 62 in which the simulated human blood vessel 22 can be positioned is formed in the simulated human radial styloid process 20. The simulated human radial styloid process 20 protrudes on the simulated human skin 24 side with respect to the horizontal plane 56 of the simulated human subcutaneous region 18 when the simulated human radial styloid process 20 is arranged in the bone arranging hole 54 (i.e., the simulated human radial styloid process 20 protrudes toward the palm side/inner side beyond the horizontal plane 56 of the simulated human subcutaneous region 18 when the simulated human radial styloid process 20 is in the bone arranging hole 54).

In the present embodiment, the simulated human radial styloid process 20 protrudes on the simulated human skin 24 side by approximately the same dimension (i.e., amount) as an outer diameter of the simulated human blood vessel 22 when the simulated human radial styloid process 20 is arranged in the bone arranging hole 54. In other words, the simulated human radial styloid process 20 protrudes relative to the horizontal plane 56 of the simulated human subcutaneous region 18 by about the same amount as the outer diameter of the simulated human blood vessel 22 when the simulated human radial styloid process 20 is arranged in the bone arranging hole 54. Accordingly, the user can easily search for the position of the simulated human radial styloid process 20 by touching the simulated human skin 24.

The configuration material of the simulated human radial styloid process 20 is not especially limited. However, for example, a photo-curing resin such as an epoxy-acrylic mixed resin can be favorably used.

The simulated human blood vessel 22 is a human blood vessel substitute that imitates a human radial artery. The simulated human blood vessel 22 is formed in a tube manner. An inner hole of one end portion of the simulated human blood vessel 22 is blocked with a blocking member 64. The inner hole of the one end portion of the simulated human blood vessel 22 may be blocked by deforming the one end portion without using the blocking member 64. The inner hole of the one end portion of the simulated human blood vessel 22 is blocked so that the pulsation can be more easily caused in the simulated human blood vessel 22 than when the simulated human blood vessel 22 is a circulation circuit (i.e., without blocking the one end portion).

The simulated human blood vessel 22 is opened when the simulated human blood vessel 22 is punctured with the vascular access device 100. The simulated human blood vessel 22 is thus replaced with a new simulated human blood vessel 22 every time or every several number of times of the simulation (i.e., after one use or after several uses/punctures). Further, to support individual differences in the outer diameter (thickness) of the radial artery of the human body, a plurality of types of simulated human blood vessel 22 with different outer diameters are prepared. Accordingly, the simulated human blood vessel 22 with an optimum outer diameter can be selected according to the proficiency of the technique of the user, and the user can experience simulation further approximating an actual technique with a human body.

The material used for the simulated human blood vessel 22 is not especially limited. However, for example, natural rubber can be favorably used. When the simulated human blood vessel 22 is made from natural rubber and the simulated human skin 24 is made from an ethylene-vinyl acetate (EVA), it is favorable to coat, with silicone, at least a portion of the simulated human blood vessel 22 to prevent swelling of the simulated human blood vessel 22. Specifically, it is favorable to coat the portion that is in contact with the simulated human skin 24.

The simulated human skin 24 is a human skin substitute that imitates a human skin. The simulated human skin 24 includes a skin main body 66 and a skin cover 68. The skin main body 66 has a shape corresponding to the deep groove 42 in the plan view. A blood vessel arranging groove 70 (in which the simulated human blood vessel 22 is arranged) and a bone arranging hole 72 (in which the simulated human radial styloid process 20 is arranged) are formed in a surface of the skin main body 66 that faces the simulated human subcutaneous region 18. The material of the simulated human skin 24 may be an EVA resin such as synthetic rubber, for example.

The skin cover 68 is configured in a sheet manner and is arranged to cover the skin main body 66. The skin cover 68 is provided with a locking member 74 such as a hook and loop fastener that holds the skin cover 68 in a state where the skin cover 68 is wound around the wrist of the arm model 14.

The configuration material of the skin cover 68 is not especially limited. However, for example, silicone rubber is favorably used. When the skin cover 68 is silicone rubber, the tear propagation strength is desirably 30 N/mm or more. This tear propagation strength allows tearing off of the skin cover 68 to be favorably suppressed from a puncture hole when the skin cover 68 is punctured with the vascular access device 100.

The simulated human blood supply section 28 includes a three-way stopcock (passage switching means) 76 to which the other end portion of the simulated human blood vessel 22 is connected (i.e., the portion opposite the fingertip side). A syringe 78 (pressure providing means) is also connected to the three-way stopcock 76, and the syringe 78 provides pressure to the simulated human blood 26 in the simulated human blood vessel 22. Finally, a blood storage section 82 is connected to the three-way stopcock 76 through an introduction tube 80. The blood storage section 82 stores the simulated human blood 26. The introduction tube 80 is provided with a clamp (passage opening/closing means) 81 that opens/closes a passage of the introduction tube 80.

As the simulated human blood 26, a mixture of a saline solution and an arbitrary coloring agent (coloring) can be used. As the coloring agent, a red coloring agent such as red food coloring can be favorably used.

The technique simulator 10 according to the present embodiment is basically configured as described above. Next, a method of training a user how to introduce a medical device into a radial artery of a human body using the technique simulator 10 will be described. Here, training for a technique to introduce a sheath 108 into a radial artery will be described.

First, the technique simulator 10 is prepared. To be specific, the simulated human subcutaneous region 18 and the simulated human radial styloid process 20 are set to (i.e., installed in or inserted into) the arm model 14. Specifically, the positioning protruding portion 52 of the simulated human subcutaneous region 18 is fit into the positioning hole 46 formed in the groove bottom surface of the deep groove 42, and the simulated human radial styloid process 20 is arranged in the bone arranging hole 54 of the simulated human subcutaneous region 18.

Then, the simulated human blood vessel 22 in which the simulated human blood 26 is primed in advance is set to (i.e., installed in or inserted into) the arm model 14. Specifically, the one end portion (blocking member 64) of the simulated human blood vessel 22 is arranged in the arranging hole 50 of the arm model 14, and the simulated human blood vessel 22 is placed in the blood vessel arranging groove 62 of the simulated human radial styloid process 20, the support groove 60 of the simulated human subcutaneous region 18, and the groove bottom surface of the shallow groove 44. Note that the simulated human blood vessel 22 with an outer diameter suitable for the intended type of training is selected from the plurality of types of simulated human blood vessels 22 with different outer diameters.

Next, the simulated human skin 24 is set to (i.e., installed on) the arm model 14. To be specific, the skin main body 66 is arranged in the deep groove 42 to cover the simulated human radial styloid process 20 and the simulated human blood vessel 22. The skin cover 68 is locked in a state of being wound around the wrist of the arm model 14 to cover the skin main body 66.

The cover portion 36 is then set to (installed in or inserted into) the arm model 14. To be specific, the other end side (i.e., the side opposite of the fingertip side) of the simulated human blood vessel 22 is passed/moved through the insertion through hole 40 of the cover portion 36. The tray 38 is inserted into the attaching hole 34 of the arm model 14. The cover portion 36 is attached to the arm model 14 so that the opening portion of the attaching hole 34 at the base end side (i.e., the side opposite to the fingertip side) is blocked with the cover portion 36. The other end portion of the simulated human blood vessel 22 (i.e., the portion on the side opposite to the fingertip side) is attached to the three-way stopcock 76.

When the preparation of the technique simulator 10 is completed, an instructor (a person who assists the person who is trained) operates the syringe 78 to provide (increase/decrease) the pressure of the simulated human blood 26 in the simulated human blood vessel 22. Accordingly, the simulated human blood vessel 22 beats.

Figure 4A:
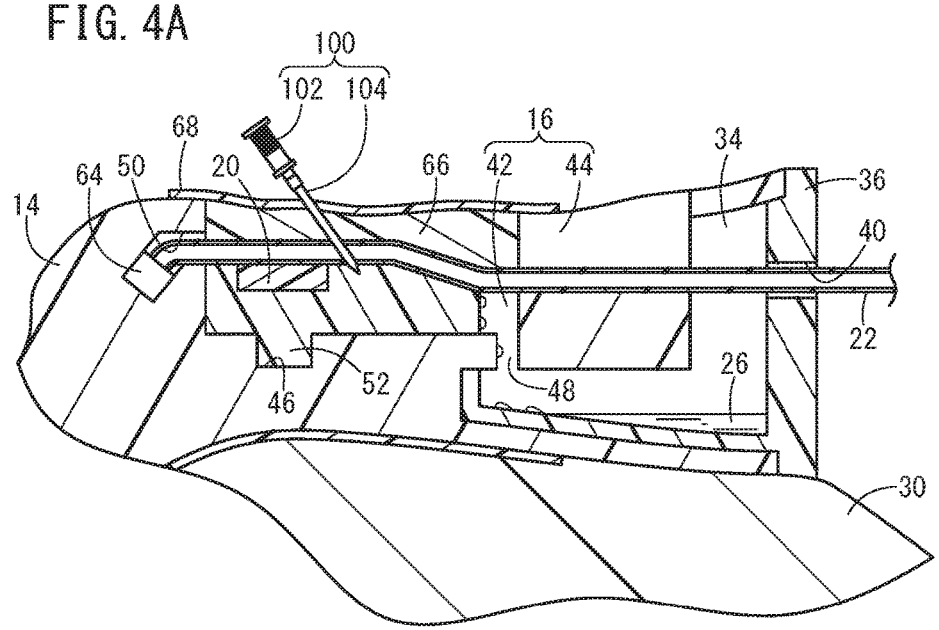
FIG. 4A is a partially omitted sectional view illustrating a state in which a simulated human blood vessel is punctured with a vascular access device.

Next, the user (i.e., the operator who is being trained) touches the skin cover 68 and searches for the position of the simulated human radial styloid process 20. Then, the user determines the position of the beating simulated human blood vessel 22 near the simulated human radial styloid process 20 using the simulated human radial styloid process 20 as an indication (i.e., the user determines the position of the beating simulated human blood vessel 22 by touching/ applying pressure to the simulated human radial styloid process 20, which indicates the position of the simulated human blood vessel 22). The user then punctures the simulated human blood vessel 22 with the vascular access device 100 (see FIG. 4A). To be specific, the user sticks the vascular access device 100 through the posterior wall of the simulated human blood vessel 22 up to the simulated human subcutaneous region 18.

When this puncturing occurs, the simulated human blood 26 leaks through the simulated human blood vessel 22. The leaking simulated human blood 26 moves along the inclined surface 58 of the simulated human subcutaneous region 18 to be led to the discharge hole 48 and then to be stored in the tray 38. This configuration prevents the simulated human blood 26 that leaks from the simulated human blood vessel 22 from flowing out of the arm model 14 and from being diffused in the arm model 14.

Even if the simulated human blood 26 leaks through the simulated human blood vessel 22, the simulated human blood 26 stored in the syringe 78 supplements the simulated human blood 26 in the simulated human blood vessel 22. Therefore, the simulated human blood 26 in the simulated human blood vessel 22 cannot become insufficient (i.e., a sufficient amount of simulated human blood 26 is provided).

The user (i.e., the operator being trained) next removes an inner needle 102 of the vascular access device 100, and slowly pulls an outer needle 104 out in a slightly laying down manner (i.e., in a manner that reduces the angle of the outer needle 104 relative to the simulated human blood vessel 22), so that a tip end of the outer needle 104 is positioned inside the simulated human blood vessel 22. Note that, in puncturing the simulated human blood vessel 22 with the vascular access device 100, the tip end of the vascular access device 100 may be positioned within the simulated human blood vessel 22 without penetrating the posterior wall of the simulated human blood vessel 22.

Figure 4B:
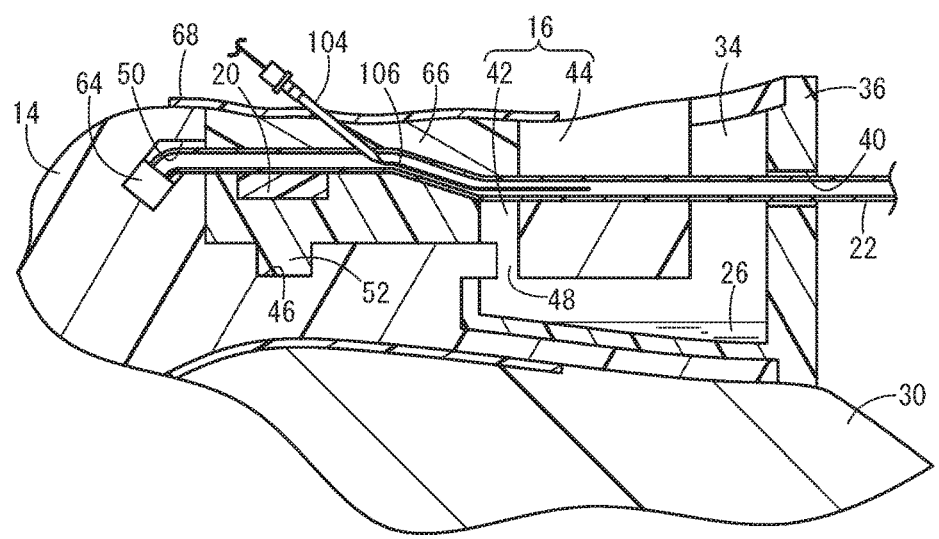
FIG. 4B is a partially omitted sectional view illustrating a state in which a guide wire is inserted into the simulated human blood vessel.
Figure 5A:
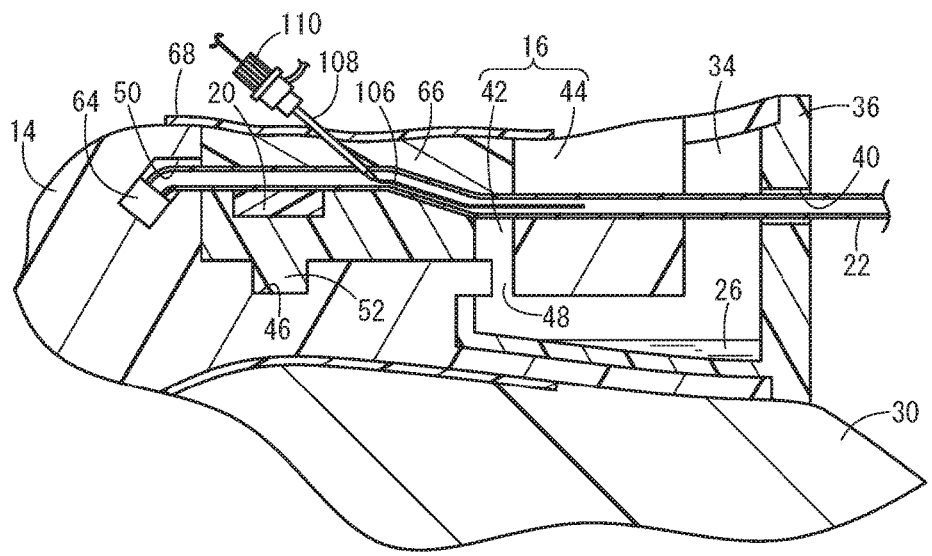
FIG. 5A is a partially omitted sectional view illustrating a state in which the simulated human blood vessel is punctured with a dilator and a sheath.

Next, a guide wire (mini guide wire) 106 is inserted into the simulated human blood vessel 22 through a bore of the outer needle 104 of the vascular access device 100 (see FIG. 4B). The outer needle 104 of the vascular access device 100 is then removed while the guide wire 106 remains in the simulated human blood vessel 22. A sheath 108 and a dilator 110 are then introduced in combination into the simulated human blood vessel 22 along the guide wire 106. The sheath 108 and the dilator 110 are primed in advance in heparin-added sterilized saline solution (see FIG. 5A).

Figure 5B:
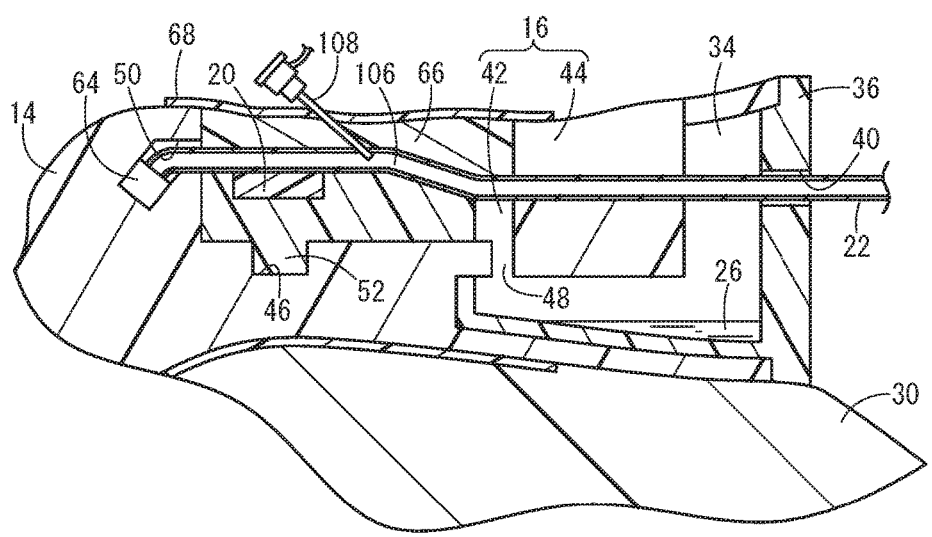
FIG. 5B is a partially omitted sectional view illustrating a state in which the guide wire and the dilator are removed from the simulated human blood vessel.

Next, the dilator 110 and the guide wire 106 are removed from the sheath 108, so that only the sheath 108 is indwelled in the simulated human blood vessel 22 (see FIG. 5B).

Following that, a hemostasis band (not illustrated) for radial artery is wound around the wrist of the arm model 14 and hemostasis is performed by the user (i.e., the operator being trained). When the hemostasis with the hemostasis band is completed, the tray 38 is taken out of the arm model 14, and the simulated human blood 26 in the tray 38 is disposed or collected in the blood storage section 82. The simulated human blood 26 leaking in the deep groove 42 is also wiped off. At this time, if an absorber such as cloth or paper that absorbs the simulated human blood 26 is arranged in the tray 38, the simulated human blood 26 in the tray 38 can be more easily disposed.

According to the present embodiment, the user can experience simulation of a plurality of techniques (puncture of the radial artery with the vascular access device 100, introduction of the guide wire 106 into the radial artery, introduction of the sheath 108 into the radial artery, and pressure hemostasis with the hemostasis band) while feeling pulsation of the simulated human blood vessel 22.

The simulated human radial styloid process 20 is arranged near the simulated human skin 24 positioned in the wrist of the arm model 14 which allows the user (i.e., the operator being trained) to search for the position of the simulated human radial styloid process 20 by touching the skin cover 68 of the wrist of the arm model 14, and thus use the simulated human radial styloid process 20 as an indication of the location of the simulated human blood vessel 22 to accurately puncture the simulated human blood vessel 22 with the vascular access device (penetration needle) 100. Therefore, the user can experience a simulation that approximates an actual technique with a human body, and can efficiently learn the technique to puncture the radial artery with the vascular access device 100.

According to the present embodiment, the simulated human blood vessel 22 is arranged in the blood vessel arranging groove 62 formed in the simulated human radial styloid process 20. Therefore, the simulated human radial styloid process 20 and the simulated human blood vessel 22 can be held/maintained in a predetermined positional relationship.

A part of the simulated human radial styloid process 20 protrudes on the simulated human skin 24 side with respect to the horizontal plane 56 of the simulated human subcutaneous region 18. Therefore, the user can reliably grasp the position of the simulated human radial styloid process 20 by touching the skin cover 68.

The simulated human subcutaneous region 18 may be made from a softer material than the arm model 14. Therefore, the technique of wall-penetration puncture to stick the vascular access device 100 to penetrate the posterior wall of the simulated human blood vessel 22 up to the simulated human subcutaneous region 18, and then to indwell the vascular access device 100 in the simulated human blood vessel 22, can be favorably (i.e., more easily) learned. A technique of anterior wall puncture to indwell the tip end of the vascular access device 100 in the simulated human blood vessel 22 without sticking the vascular access device 100 to the posterior wall of the simulated human blood vessel 22 can also be learned.

In the present embodiment, the inclined surface 58 inclined towards the groove bottom surface side of the deep groove 42 is formed in at least a part of the surface where the simulated human blood vessel 22 is arranged in the simulated human subcutaneous region 18 along the direction from the wrist to the forearm of the arm model 14. Therefore, a simple configuration allows the simulated human blood vessel 22 to be positioned to incline towards the groove bottom surface side as the simulated human blood vessel goes from the wrist to the forearm of the arm model 14.

The simulated human blood vessel 22 can thus be less easily searched for (i.e., searching for the simulated human blood vessel 22 is more difficult) in the inclined region as the simulated human blood vessel goes from the wrist to the forearm side of the arm model 14 (as the simulated human blood vessel 22 is farther away from the simulated human radial styloid process 20). Therefore, the user can experience a simulation that further approximates an actual technique with a human body.

According to the present embodiment, the simulated human blood 26 leaking out through the simulated human blood vessel 22 in puncturing the simulated human blood vessel 22 with the vascular access device 100 can be received by the tray 38. Therefore, the technique simulator 10 can be easily restored to a clean state.

Further, the tray 38 is detachably provided in the arm model 14. Therefore, the tray 38 in which the simulated human blood 26 accumulates can be taken out of the arm model 14 and can be easily restored to a clean state, and the simulated human blood 26 can be easily disposed or re-used.

Further, the simulated human blood vessel 22 can beat (i.e., pulsate or pulse) under the action of the syringe 78. Therefore, the user can experience a simulation that further approximates an actual technique on a human body. Blocking the inner hole of the one end portion of the simulated human blood vessel 22 simplifies the configuration so that the pulsation can be easily caused in the simulated human blood vessel 22, compared with a case where the simulated human blood vessel 22 is a circulation circuit (i.e., the simulated human blood 26 circulates through the simulated human blood vessel 22).

Figure 6:
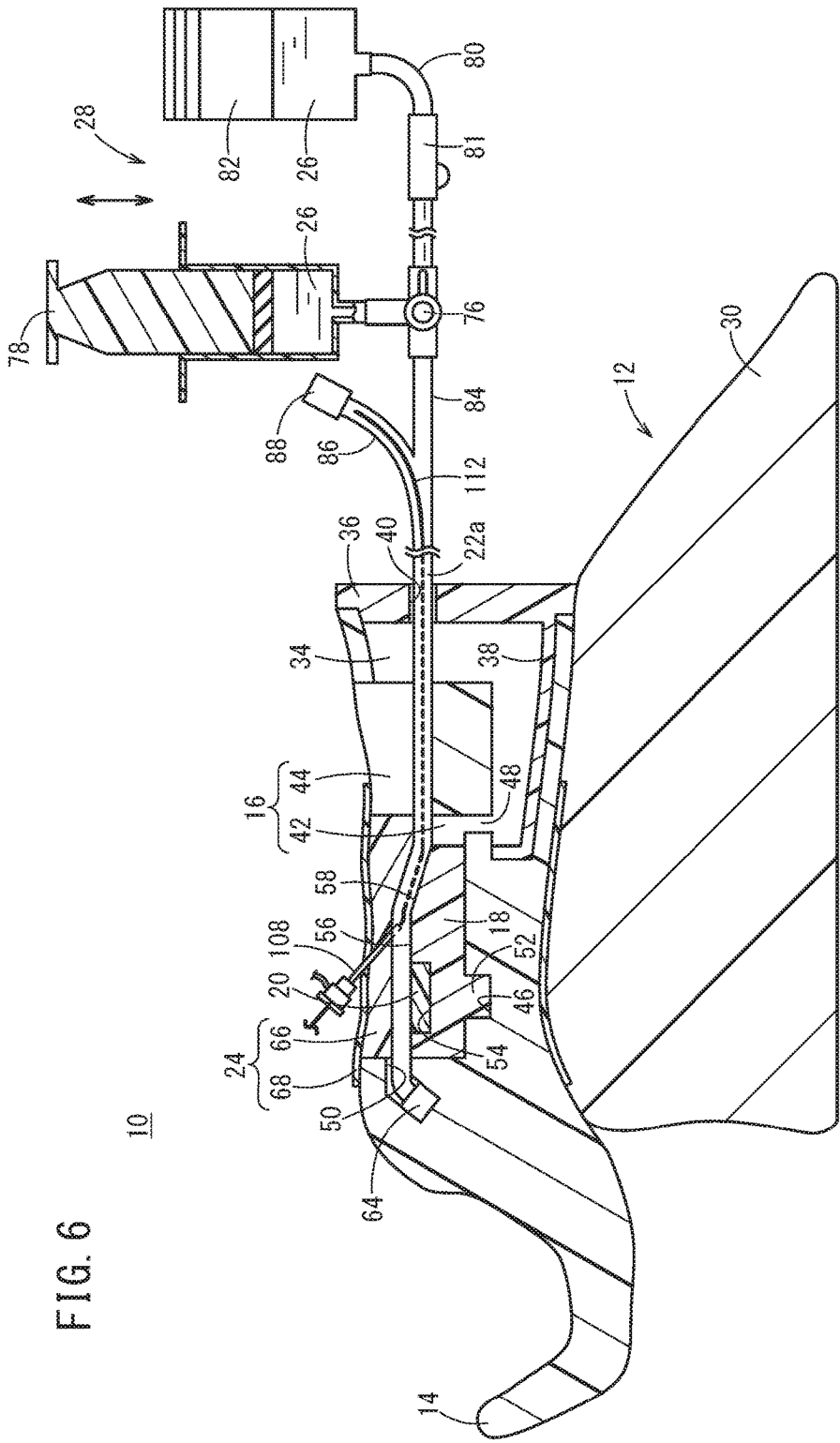
FIG. 6 is a schematic sectional view for describing a simulated human blood vessel according to a modification of the technique simulator.

The present embodiment is not limited to the above-described configuration. As illustrated in FIG. 6, the technique simulator 10 may include a simulated human blood vessel 22a instead of the simulated human blood vessel 22 described above. The other end side (i.e., the side opposite to the fingertip end side) of this simulated human blood vessel 22a branches to two passages. The three-way stopcock 76 is connected to an end portion of one branch passage 84, and a blocking member 88 is provided in an end portion of the other branch passage 86. The one branch passage 84 corresponds to ulnar artery of the human body and the other branch passage 86 corresponds to branchial artery of the human body. These branch passages 84 and 86 are desirably made from a transparent material.

When using the technique simulator 10 of FIG. 6, for example, the user can also favorably experience a technique to insert a guide wire 112 into the simulated human blood vessel 22a through the sheath 108 to lead the guide wire 112 to the other branch passage 86, thereby to insert the guide wire 112 into the radial artery of the human body through the sheath 108 indwelled in the radial artery to the brachial artery. When the branch passages 84 and 86 are made from a transparent material, the user can easily confirm whether the guide wire 112 can be correctly led to the other branch passage 86.

Further, in the present embodiment, as the pressure providing means, an electrically-driven air pump or blower may be used, in place of the syringe 78.

It is apparent that the technique simulator disclosed here is not limited to the above-described embodiments and can employ various configurations without departing from the gist of the present disclosure.

The detailed description above describes a technique simulator and a method of using the technique simulator. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A technique simulator for training a user to introduce a medical device into a radial artery of a human body, the technique simulator comprising:
   an arm model possessing an appearance that imitates portions of a human arm, the portions of the human arm including at least a wrist, the arm model comprising a storage groove;
   a simulated human subcutaneous region arranged in the storage groove formed in the wrist of the arm model;
   a simulated human radial styloid process arranged in a bone arranging hole formed in the simulated human subcutaneous region; and
   a simulated human skin that covers a simulated human blood vessel, the simulated human blood vessel configured to be inserted in the simulated human subcutaneous region and the simulated human radial styloid process.

2. The technique simulator according to claim 1, wherein the simulated human radial styloid process comprises a blood vessel arranging groove, the simulated human blood vessel being positioned in the blood vessel arranging groove.

3. The technique simulator according to claim 1, wherein the simulated human radial styloid process is arranged in the bone arranging hole such that a part of the simulated human radial styloid process protrudes on a side of the simulated human skin beyond the simulated human subcutaneous region.

4. The technique simulator according to claim 1, wherein the simulated human subcutaneous region is made from a softer material than the arm model.

5. The technique simulator according to claim 1, wherein the simulated human blood vessel extends at an angle such that the simulated human blood vessel becomes closer to a groove bottom surface of the storage groove as the simulated human blood vessel extends from the wrist to a forearm side of the arm model.

6. The technique simulator according to claim 5, wherein at least a part of a surface where the simulated human blood vessel is arranged in the simulated human subcutaneous region is inclined towards the groove bottom surface of the storage groove along a direction from the wrist to the forearm of the arm model.

7. The technique simulator according to claim 1, further comprising
   a discharge hole in a groove bottom surface of the storage groove, the discharge hole being configured to allow simulated human blood in the simulated human blood vessel to pass therethrough, and
   a tray configured to receive the simulated human blood that passes through the discharge hole.

8. The technique simulator according to claim 7, wherein the tray is detachably connected to the arm model.

9. The technique simulator according to claim 1, wherein an inner hole of one end portion of the simulated human blood vessel is blocked, and
   the technique simulator further comprises pressure providing means that provides pressure to the simulated human blood in the simulated human blood vessel.

10. A technique simulator for training a user to introduce a needle into a radial artery of a human body, the technique simulator comprising:
    an arm model possessing an appearance that imitates a wrist portion of a human arm, the arm model comprising a storage groove and a positioning hole extending below the storage groove;

a simulated human subcutaneous region possessing a top surface and a bottom surface, the simulated human subcutaneous region comprising a bone arranging hole on the top surface and a protrusion on the bottom surface;

the simulated human subcutaneous region being configured to be placed in the storage groove of the arm model, the positioning hole of the arm model being configured to receive the protrusion of the simulated human subcutaneous region when the simulated human subcutaneous region is in the storage groove;

a simulated human radial styloid process configured to be placed in the bone arranging hole, the simulated human radial styloid process comprising a blood vessel groove;

a simulated human blood vessel configured to be placed in the blood vessel groove of the simulated human radial styloid process; and a simulated human skin configured to be placed over the top surface of the simulated human subcutaneous region to cover the simulated human radial styloid process and the simulated human blood vessel when the simulated human radial styloid process is in the bone arranging hole and the simulated human blood vessel is in the blood vessel groove of the simulated human radial styloid process, the simulated human skin comprising a locking mechanism that is configured to attach the simulated human skin to the arm model.

11. The technique simulator according to claim 10, wherein the simulated human subcutaneous region is made of a softer material than the simulated human radial styloid process.

12. The technique simulator according to claim 10, wherein the simulated human blood vessel is a tubular body and the simulated human blood vessel contains simulated human blood.

13. The technique simulator according to claim 12, wherein the arm model comprises fingertips and an opening at a side opposite the fingertips; and the technique simulator further comprises a cover configured to be inserted into the opening of the arm model.

14. The technique simulator according to claim 13, wherein the cover comprises a tray configured to collect the simulated human blood when the simulated human blood vessel is punctured by the needle.

15. The technique simulator according to claim 10, further comprising a syringe connected to the simulated human blood vessel, the syringe configured to store simulated human blood, and the syringe being movable to introduce a pulsation of the simulated human blood within the simulated human blood vessel.

16. A method comprising:

locating a simulated human radial styloid process in a technique simulator, the technique simulator comprising an arm model, a simulated human blood vessel in a groove of the simulated human radial styloid process, and a simulated human skin attached to the arm model to cover the simulated human radial styloid process and the simulated human blood vessel;

wherein the locating of the simulated human radial styloid process includes applying pressure to the simulated skin surface covering the simulated human radial styloid process of the technique simulator to locate a position of the simulated human radial styloid process and thereby identify a location of the simulated human blood vessel; and using the identified location of the simulated human blood vessel to puncture the simulated human blood vessel with a needle.

17. The method according to claim 16, wherein the puncturing of the simulated human blood vessel creates a puncture hole in the simulated human blood vessel, and the method further comprises inserting a guidewire into the puncture hole in the simulated human blood vessel.

18. The method according to claim 16, wherein simulated human blood is in the simulated human blood vessel.

19. The method according to claim 18, further comprising pulsating the simulated human blood in the simulated human blood vessel while the pressure is being applied to locate the position of the simulated human blood vessel.

* * * * *